US 6,571,299 B1

(12) United States Patent
Schroyer et al.

(10) Patent No.: US 6,571,299 B1
(45) Date of Patent: May 27, 2003

(54) SYSTEM FOR RECEIVING ID-CODES FROM AT LEAST ONE WIRELESS TRANSMITTER HAVING A PLURALITY OF TRANSMITTER BUTTONS EACH OF THEM BEING INDIVIDUALLY PROGRAMMED

(76) Inventors: Robert Schroyer, 4810 Waltshire La., McHenry, IL (US) 60050; Rick McGuire, 5423 Summerville Ave., Wonder Lake, IL (US) 60094; Heladio Valencia, 1121 Barberry, Round Lake Beach, IL (US) 60073; James Mosenfelder, 1644 Mosenfelder, Escabana, MI (US) 49829

( * ) Notice: Subject to any disclaimer, the term of this patent is extended or adjusted under 35 U.S.C. 154(b) by 0 days.

(21) Appl. No.: 09/236,429

(22) Filed: Jan. 25, 1999

(51) Int. Cl.⁷ ............................................. G06F 13/14
(52) U.S. Cl. ............................... 710/6; 345/2; 345/158; 345/327; 340/825.52
(58) Field of Search ..................... 710/6; 345/2, 158, 345/327; 340/825.52

(56) References Cited

U.S. PATENT DOCUMENTS

| 4,392,132 | A |   | 7/1983  | Derks ................. 340/825.14 |
|-----------|---|---|---------|--------------------------------|
| 4,754,268 | A |   | 6/1988  | Mori ...................... 340/710 |
| 4,775,928 | A |   | 10/1988 | Kendall et al. ............ 364/200 |
| 4,853,888 | A | * | 8/1989  | Lata et al. |
| 4,964,075 | A | * | 10/1990 | Shaver et al. ............... 710/67 |
| 5,038,144 | A |   | 8/1991  | Kaye ...................... 341/176 |
| 5,093,786 | A |   | 3/1992  | Derks ..................... 395/800 |
| 5,150,118 | A |   | 9/1992  | Finkle et al. ............... 341/23 |
| 5,189,543 | A | * | 2/1993  | Lin et al. .................. 359/142 |
| 5,278,551 | A |   | 1/1994  | Wakatsuki et al. ..... 340/870.02 |
| 5,379,213 | A |   | 1/1995  | Derks ..................... 364/411 |
| 5,515,051 | A |   | 5/1996  | Tanaka et al. ............. 341/174 |
| RE35,449  | E |   | 2/1997  | Derks ..................... 395/800 |
| 5,757,354 | A | * | 5/1998  | Kawamura ................ 345/126 |
| 5,790,201 | A | * | 8/1998  | Antos ...................... 348/552 |
| 5,880,721 | A | * | 3/1999  | Yen ........................ 345/327 |
| 5,955,975 | A | * | 9/1999  | Frederick et al. ............ 341/22 |
| 5,958,023 | A | * | 9/1999  | Klein ....................... 710/18 |
| 6,018,335 | A | * | 1/2000  | Onley et al. ............... 345/172 |
| 6,052,116 | A | * | 4/2000  | Takagi ..................... 345/169 |
| 6,064,368 | A | * | 5/2000  | Kang ....................... 345/158 |
| 6,097,374 | A | * | 8/2000  | Howard .................... 345/168 |
| 6,131,130 | A | * | 10/2000 | Van Ryzin ..................... 710/6 |
| 6,133,833 | A | * | 10/2000 | Sidlauskas et al. ...... 340/572.1 |
| 6,138,050 | A | * | 10/2000 | Schneider et al. ............ 700/84 |

* cited by examiner

Primary Examiner—Thomas Lee
Assistant Examiner—Abdelmoniem Elamin

(57) ABSTRACT

A wireless, remote, programmable keyboard input system for computers is provided. A single receiver is capable of simultaneous receipt of RF ID-Code transmissions from multiple remote transmitters, is plugged into the keyboard port of the central processing unit of a computer. The computer's standard keyboard is then plugged into the receiver and remains fully functional. The RF ID-Code of each button of each remote hand held transmitter is a unique fixed code. The receiver in this system is programmed by associating, in the receiver's memory, a unique transmitter button ID-Code with the scancode or modified scancode of a key or modified key from the standard keyboard of the computer. When the receiver, in the operation mode, recognizes that RF ID-Code from that transmitter button, it pulls the associated scancode or modified scancode from its memory and sends it off to the CPU of the computer. When several such previously programmed RF ID-Codes are sent to the receiver in succession, the receiver recognizes them in sequence and sends the corresponding scancodes or modified scancodes off to CPU in that same sequence. The invention can operate using either radio frequency or infrared frequency waves. A method of programming the system is also provided.

18 Claims, 4 Drawing Sheets

SYSTEM FOR RECEIVING ID-CODES FROM AT LEAST ONE WIRELESS TRANSMITTER HAVING A PLURALITY OF TRANSMITTER BUTTONS EACH OF THEM BEING INDIVIDUALLY PROGRAMMED

I. FIELD OF THE INVENTION

The present invention relates to computer keyboards. More particularly, the present invention relates to a remote, wireless, programmable keyboard input system for computers in which a plurality of remote transmitters can simultaneously transmit I D Codes to a single receiver. The remote transmitters send fixed radio frequency ("RF") or infrared ("IR") wave I D Codes to the receiver. The receiver is connected to the keyboard port of a computer's central processing unit. The computer's standard keyboard connects to the receiver and remains fully functional. The receiver has the capacity to recognize the ID-Code transmitted by a particular button on a transmitter and to associate that code with a particular scancode sent by a key of a standard keyboard. The invention permits customization of the receiver and the associated scancodes held in its memory through a programming sequence that involves the receiver, the transmitter and the computer's standard keyboard.

II. DEFINITIONS

Definition of terms used in this Patent Application:
1. "Button"
The user activated controls on the transmitter. In the preferred embodiment these are membrane switches, but could be any type of switches or sensors that send a closed/open signal to the transmitter's circuitry.
2. "ID-Code"
An identification code that is sent by the transmitter when one of its Buttons is pressed. The ID-Code includes a transmitter number and a button number. The ID-Code for each Transmitter and each Button is assigned at the time of manufacture. The ID-Code is sent by means of emitting a modulated packet of radio frequency wave pulses or infrared light pulses.
3. "Key"
The keys on a standard keyboard.
4. "Keyboard port"
The hardware interface socket on the computer's central processing unit (CPU) where the standard keyboard is connected. On a laptop computer it is the socket where an external standard keyboard is connected.
5. "Modified Scancode"
The scancode sequence that results when one or more modifier keys are held down while pressing another key.
6. "Modifier Key"
A key on the standard keyboard that, when held down while pressing one of the other keys, modifies the meaning of the other key. Examples of modifier keys are: "Shift", "Control", "Command", "Alt", and "Option".
7. "Receiver"
The hardware device, connected between the standard keyboard and the keyboard port, that recognizes and accepts ID-Codes from transmitters with which it has previously been trained to recognize, associates each ID-Code with the scancode, or modified scancode, learned in the training sequence and held in its memory, and sends that scancode on to the CPU, the same as if it were coming from the standard keyboard.
8. "Scancode"
A binary code that identifies a key that has been pressed or released on a standard keyboard. This code is sent by the standard keyboard to the keyboard port. In the programming method, the receiver monitors and learns these scancodes and holds them in its memory.
9. "Standard keyboard "
The original, normal, "typewriter" style keyboard that is generally included with a desktop personal computer. Note: For a portable, laptop computer, an externally connected standard keyboard must be attached to the receiver for the programaing method described herein to function as designed.
10. "Transmitter"
The hand held remote device that sends fixed radio frequency ID-Codes. Several transmitters may send their ID-Codes to a single receiver that has been defined to recognize these ID-Codes. The same transmitter's ID-Codes can also be recognized by more than one receiver.

III. BACKGROUND OF THE INVENTION AND PRIOR ART

Manipulation and entry of keyboard input into a computer's central processing unit is often accomplished through the use of a standard keyboard. A standard keyboard sends scancodes which are represented by electrical signals to the central processing unit. Standard keyboards are typically connected to the keyboard of the central processing unit by a connector wire. Each central processing unit is typically connected to only one standard keyboard and, therefore, only receives keyboard input from this single source.

Most standard keyboards also limit transmission to a single alpha-numeric character at a time. If the user wishes to transmit multiple characters or instructions with a single keystroke, "macro" commands must be created within the specific individual software program being used, the standard keyboard is us ed merely to access the macro. Advances in keyboard technology have also produced keyboards that can be programmed to transmit macros.

The traditional configuration is cumbersome and limiting inasmuch as a single user must remain stationary in relationship to a computer to input keystrokes. As advances in technology have occurred, the need for remote keyboard input systems has become evident.

Attempts to overcome some of the shortcomings of standard computer input systems have been made. The advancements have generally focused on specific needs or functions. For example, U.S. Pat. No. 4,775,928 to Kendall, et al., teaches a hand-held wireless computer controller system. The device is a battery powered control station that transmits alpha-numeric characters and control functions to a receiver interfaced with a host computer via an RS 232 serial link. The receiver echoes back the transmitted information to the control station where it is visualized on a display. While providing advancements in remote transmission of data to a central processing unit, there are several shortcomings to this patent. A first shortcoming of this device is that it permits only a single control station to interface with a central processing unit. The patent does not teach or discuss the possibility of several remote stations accessing a central processing unit simultaneously. It follows that the patent offers no teaching of the ability to record the chronology of responses received from multiple transmitting stations. A second shortcoming of this device is that it enters the computer through an RS 232 port, not the CPU's keyboard port; it is therefore limited to use by special software written to look for these alpha-numeric characters and control functions at this RS 232 port. It cannot interface with off-the-shelf software that looks for scancode input at the keyboard port. Yet another shortcoming of this art is that the keystrokes are predefined. The patent does not teach ability to the program individual keys for the transmission of input specific to a software application.

Further improvements in wireless remote transmission systems are seen in U.S. Pat. Nos. 5,093,786 (RE 35,449) and 5,379,213 to Derks. U.S. Pat. No. 5,093,786 (RE 35,449) discloses a wireless transceiving device in which a plurality of remote response units interface with a central control unit for transmission of input, such as answers to questions posed, from the remote response units to the control unit. The central control unit checks for a valid response and, once a valid response is received, places the remote response unit in an "off" position. While this patent offers advances to the art of wireless remote transmission of input, namely increased transmission speed and multiple remote user capabilities, it is not without shortcomings. First, the patent does not teach the possibility of programmable keypads. Second, input received by the control unit is not captured chronologically, only valid responses are acknowledged, the order in which they are received is not relevant. A third shortcoming of the device is that the system is software controlled, making installation unduly burdensome and requiring use of valuable memory. Again, the controller enters through an RS 232 serial port rather than the standard keyboard port of the CPU. It cannot be used with off-the-shelf software.

U.S. Pat. No. 5,379,213, also to Derks, teaches a testing system and method in which multiple test takers equipped with remote response units can be simultaneously tested. This patent relies upon the same basic technology as the other cited Derks patent. Test takers respond to written questions by activating a keystroke. The central processing unit receives and stores the response which is then evaluated. Like the prior cited Derk's patents, this art offers advances in the transmission of input from multiple remote units, but it also suffers from the same shortcomings as the other Derk's patent, namely: it does not provide for programmable keystrokes, it does not permit the chronological sequences of responses from various user, and it is internal software dependent.

Other examples of wireless data transmission systems are seen in U.S. Pat. No. 5,515,051 to Tanaka et al., and U.S. Pat. No. 4,654,818 to Wettenauer.

As a result, there is need for an input transmission system for computers which permits multiple remote unit users to simultaneously transmit input signals to a receiving unit. The system should further provide for the sequential recognition of each signal transmitted by the remote units. The system should further permit the programming to associate particular buttons on particular transmitters with any required standard keyboard key or modified key. The system should not be dependent upon internal software and should be capable of interacting with any software that uses standard keyboard scancode input and should be easy to install and use.

IV. OBJECTS OF THE INVENTION

It is therefore an object of the present invention to provide a wireless remote standard keyboard input system for computers which enables multiple remote unit input to occur simultaneously, wherein each input signal is received in the order in which it is sent, associated with a related scancode, and entered into the computer's CPU keyboard port in the same chronological sequence.

It is another object of the present invention to provide such a system which operates using either radio frequency wave or infrared wave technology.

It is a further object of the present invention to provide such a system in which the receiver may be programmed to associate transmitted ID-Codes from a particular transmitter button to specific scancodes representing specific keys or modified keys from the standard keyboard.

It is yet a further object of the present invention to provide such a system in which the receiving unit can be plugged into the keyboard port of the CPU without disabling the standard keyboard of the computer.

V. SUMMARY OF THE INVENTION

The objects of the invention are provided in a wireless, remote programmable keyboard input system for computers and method for programming same. According to the invention, a single receiving unit capable of receiving ID-Code transmissions from multiple remote transmitters is plugged into the keyboard port of a central processing unit. The receiver is adapted to permit the computer's standard keyboard to be plugged into it and continue to operate normally through it. The receiver accepts ID-Codes transmitted by the remote transmitters, identifies the button and the transmitter from which the ID-Code has been received, and associates this ID-Code with a related scancode and transfers this scancode to the central processing unit. If the associated scancode is for a modified key, the scancode for the modifier key(s) is (are) sent before the scancode for the modified key.

In this embodiment, the remote transmitters are battery powered, hand held devices, having a face containing multiple buttons. Each button transmits a unique ID-Code to the receiver. The receiver associates the ID-Code with a single scancode or a modified scancode from the standard keyboard. However, an alternate embodiment envisions the receiver having the capability to associate this ID-Code with multiple scancodes from a series of keys or modified keys, via a "macro" command, as defined in the programmable aspect of the invention.

Programming occurs in the receiver in a three step process: (1) the programming sequence is initiated by activating a switch located on the receiver, (2) the transmitter button to be defined is then depressed, and (3) the corresponding key or modified key on the standard keyboard is depressed. After completion of the programming phase, pressing that button on that remote transmitter transmits a fixed "RF" or "IR" ID-Code, it is recognized by the receiver as corresponding to the previously selected standard keyboard scancode or modified scancode. In an alternate embodiment, multiple standard keyboard scancodes may be triggered in the receiver through a single remote transmitter button by creation of "macro" commands in the Device's receiver.

VI. BRIEF DESCRIPTION OF THE DRAWINGS

Other objects and advantages of the invention will become apparent upon reading the following detailed description of the preferred embodiment and upon reference to the drawings, in FIG. 1 is a diagram illustrating the inventive device connected to a computer.

FIG. 3-2 is a flow chart illustrating the delete sequence.

VII. DESCRIPTION OF THE PREFERRED EMBODIMENT

While the description of the preferred embodiment uses an example of a Personal Computer, those skilled in the arts will quickly appreciate that the invention is easily adaptable for use on any desktop or laptop or mainframe computer that uses standard keyboard input. It should be understood that the description is not intended to limit the invention, but is to cover all alternatives, modifications, and equivalents as may be included within the spirit and scope of the invention.

Figure 1:
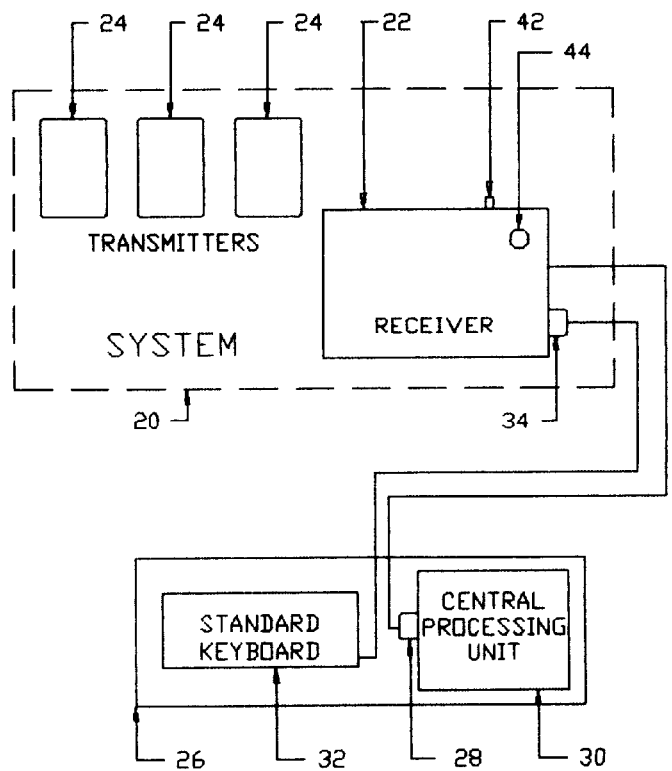
FIG. 3-1 is a flow chart illustrating the programming sequence.

Turning to FIG. 1, there is shown a programmable, wireless remote keyboard input system 20 ("System") for computers, comprising a receiver 22 connected to a computer 26, and multiple Transmitters 24. Receiver 22 plugs into the keyboard port 28 of Central Processing Unit 30. Standard keyboard 32 is then connected to the keyboard port 34 of receiver 22. Transmitters 24 are wireless remote features of System 20.

Figure 2:
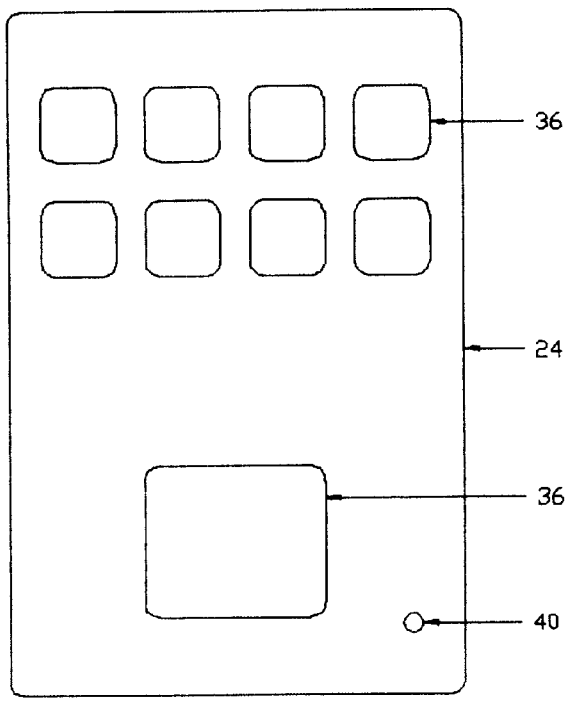
FIG. 2 is a top view of a Transmitter illustrating the keypad portion, including buttons and a transmission confirming light.

As depicted in FIG. 2, transmitters 24 have a keypad of multiple buttons 36, in this case nine buttons, and an LED light 40. Activation of a button transmits an RF wave ID-Code to receiver 22. RF waves are preferable inasmuch as their use eliminates the user having to have a direct line of sight to the receiver as is required when using IR wavelength signals. Although, and as will be appreciated by those skilled in the arts, infrared wave transmission systems may also be employed. The inventors contemplate that the RF signal can be transmitted up to 50 feet; however, the transmission distance is only limited by the power source of the transmitter and by FCC requirements for radio licensure. Further, the number of buttons on transmitter 24 is only limited by the design requirements of the system. As those skilled in the arts will quickly understand, the transmitters can be made to include numerous buttons, perhaps equal in number to the keys of a standard computer keyboard.

Transmitters 24 further include an LED light source 40 and an internal buzzer (not shown). When any of buttons 36 are depressed, LED light source 40 and the buzzer system are activated, signaling to the User that the transmission is occurring.

Receiver 22 is connected to central processing unit 30 through the keyboard port 28 of the unit. In turn, the standard keyboard 32 is then connected to keyboard port 34 of receiver 22. This electrical configuration of this connection permits standard keyboard port 32 to operate normally through receiver 22 and further permits use of keyboard 32 to assist in programming the receiver 22. The receiver 22 monitors the scancodes sent by the standard keyboard 32 and always sends that scancode on to the CPU 30.

Currently, receiver 22 is capable of receiving ID-Code transmissions from up to sixteen separate transmitters 24. However, this number is only limited by the memory of receiver 22; future versions will undoubtably carry more memory and, therefore, be able to receive transmissions from ever larger groups of transmitters.

Each transmitter 24 is assigned one of 1023 ID-Codes at the time of manufacture. When a transmitter button 36 is activated, the prescribed ID-Code, including transmitter number and button number, is transmitted. Receiver 22 is programmed to recognize this ID-Code and to associate it with a specific scancode or modified scancode. Receiver 22 sends this specific scancode to the CPU 30 whenever it recognizes the associated ID-Code.

Figures 1, 3:
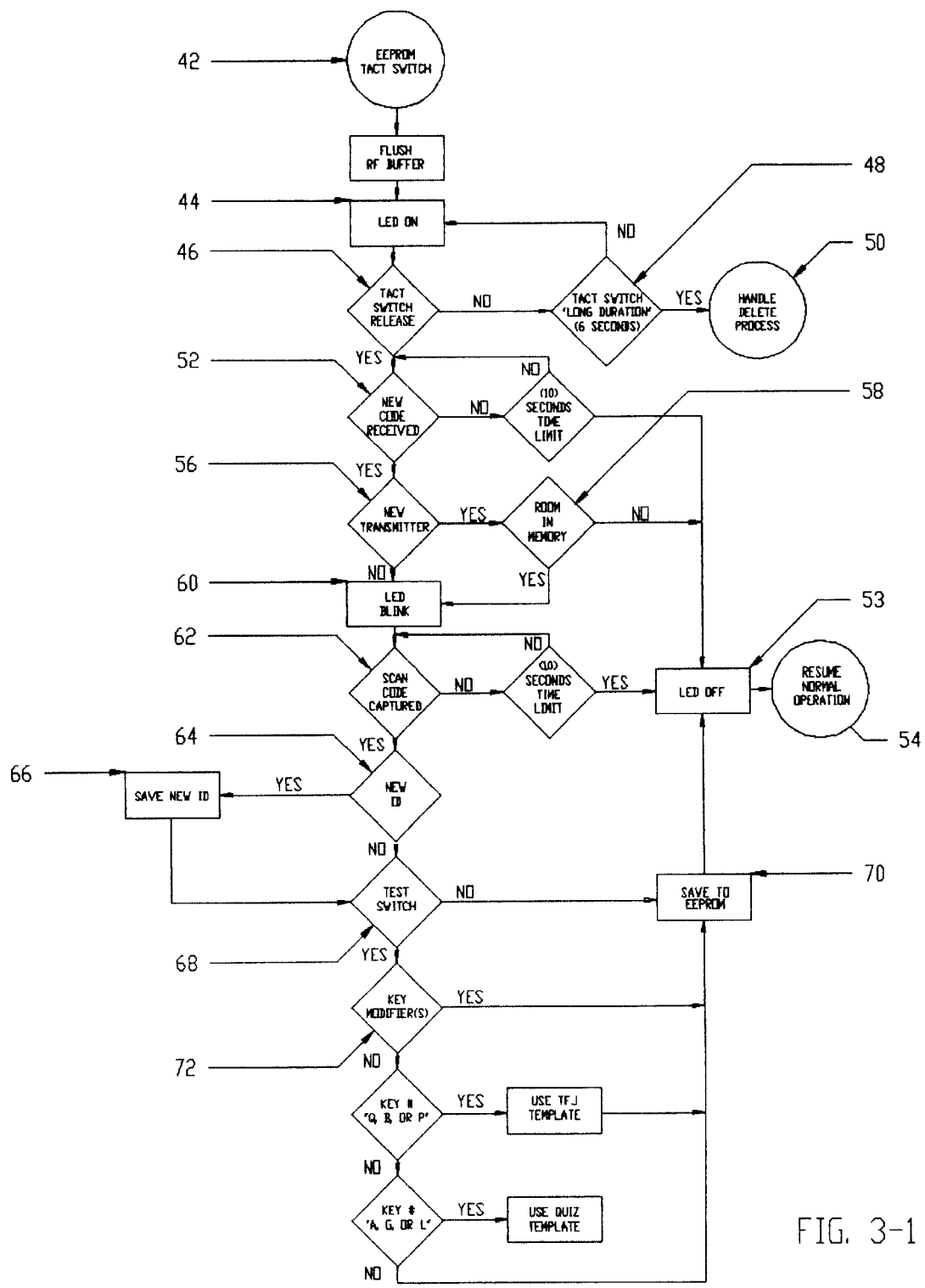
Figures 2, 3:
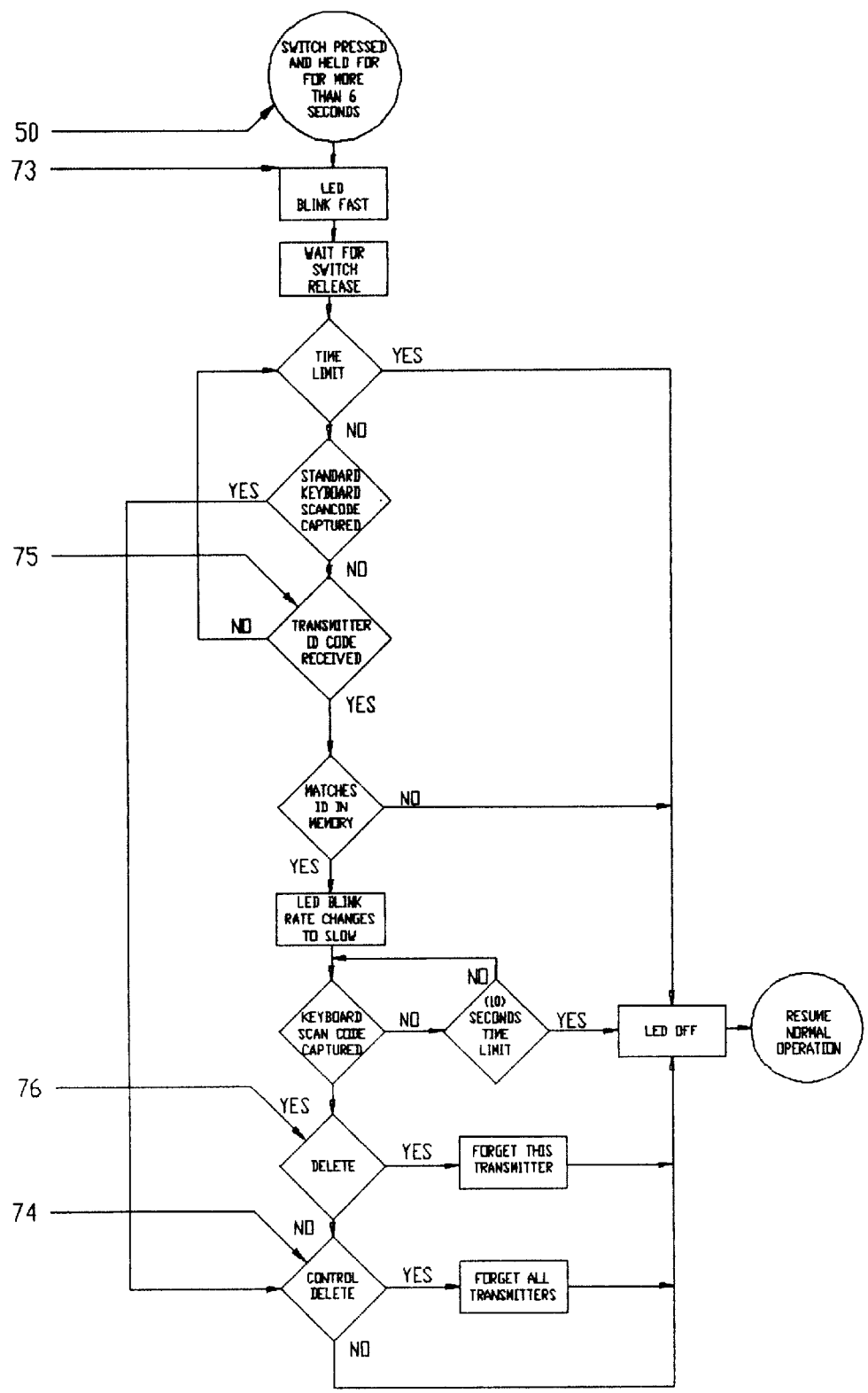

The programming sequence for receiver 22 is made with reference to FIG. 3-1. The programming process is initialized by activation of a "define" tact switch 42 located on receiver 22. Once activated, an LED light source 44 on receiver 22 remains in a lit state throughout the programming or delete process. Tact switch 42 is dual function in that if it is pressed at 42 and released at 46 in less than 6 seconds, the system goes into define function. If tact switch 42 is activated and held closed for six seconds or longer at 48, the system goes into a delete status at 50. If the tact switch is pressed and released in less than six seconds, receiver will remain in a define status for tens seconds 52. If no transmitter button 36 is pressed within this ten seconds, the receiver 22 goes back into normal state 54 and no training will occur. If button 36 on transmitter 24 which is to be defined is pressed within this ten seconds, an ID-Code is sent to the receiver 22 at 56. If the ID-Code is new, the memory is searched for storage space availability at 58. If there is not sufficient space available, LED 44 goes out at 53 and the system goes back into normal operating mode at 54.

If there is memory available or if the system determines that the ID-Code sent is not new but is instead to be a redefinition, receiver LED 44 begins to blink at 60. This indicates that the selected key or modified key on the standard keyboard should be pressed 62. If no key is pressed within ten seconds, LED 44 turns off at 53 and the system returns to normal operating mode 54. If pressed within ten seconds, the scancode or modified scancode is captured at 64 and it is saved at 66, Tact switch 42 is then checked. If it has not been pressed again at 68, the information is put into memory at 70 and the system returns to normal operating mode at 54. If the tact switch has been pressed at 68, the system goes into a special programming sequence, assigning all the buttons on this transmitter to a prescribed template of scancodes.

This process may be repeated for every button 36 and for each transmitter 24. The system may be defined as necessary. As evidenced by the above description, the programmed information is stored within the Receiver 22 and not the transmitters 24. Therefore, the transmitters 24 which always transmit the same ID-Codes, can be defined within a number of receivers 22, making mixing of systems possible.

It will also be apparent to those skilled in the arts that the programming sequence can be used to define mouse functions or other modified key functions (e.g. "commands" to save) that can be controlled by the standard keyboard 32. The programming sequence used is the same.

Macro command programming is also contemplated by the Inventors. The programming sequence will be the same with the addition multiple keys from the standard keyboard 32 being stored by the receiver 22 in association with each transmitter button 36.

As shown in FIG. 3-2, it is possible to delete from memory all of the scancodes in a receiver 22 or just the scancodes associated with a particular transmitter 24. Receiver 22 is put into the delete mode at 50 by pressing and holding for more than six seconds, its tact switch 42. LED 55 on receiver 22 begins to blink rapidly at 73. If, within ten seconds, the "control" and "delete" keys on the standard keyboard 32 are pressed at the same time at 74, all of the stored scancodes will be erased from that receiver's 22 memory. If, during the ten seconds while the LED is blinking rapidly, a button 36 on a transmitter 24 that has been programmed to this receiver 22 is pressed, sending its ID-Code at 75 to that receiver 22, the LED 44 will begin to blink more slowly. If, then, within ten seconds, the "delete" key at 76 on standard keyboard 32 is pressed, all of the scancodes associated with that transmitter 24 will be erased from that receiver's 22 memory.

Each transmitter 24 is a hand held battery operated unit. To conserve power, transmitters 24 are equipped with a "low power" circuitry which deactivates a transmitter if no button 36 has been activated for ten minutes. To reactivate transmitter 24, any button 36 on transmitter 24 must be pressed.

As described above, receiver 22 is capable of receiving and recognizing I D Codes from up to sixteen transmitters 24. This number is only limited by receiver 22 memory. The system is useful, therefore, in settings in which multiple standard keyboard inputs need to be sent to the central processing unit 30. For instance, the inventive device is suitable for classroom use wherein the instructor asks questions of the class and the students can supply answers. An advantage over the prior art is the ability of the inventive device to sequentially recognize and send the answers on to the CPU in the same order as received from each transmitter. Thus, the inventive device can be used for timed events in order to determine the order of receipt of answers, or in situations in which group interaction is desired. The inventive device is also used for polling. The inventors also contemplate that the inventive device can be expanded and replace some, if not all, of the functions of a standard keyboard.

Figure 4:
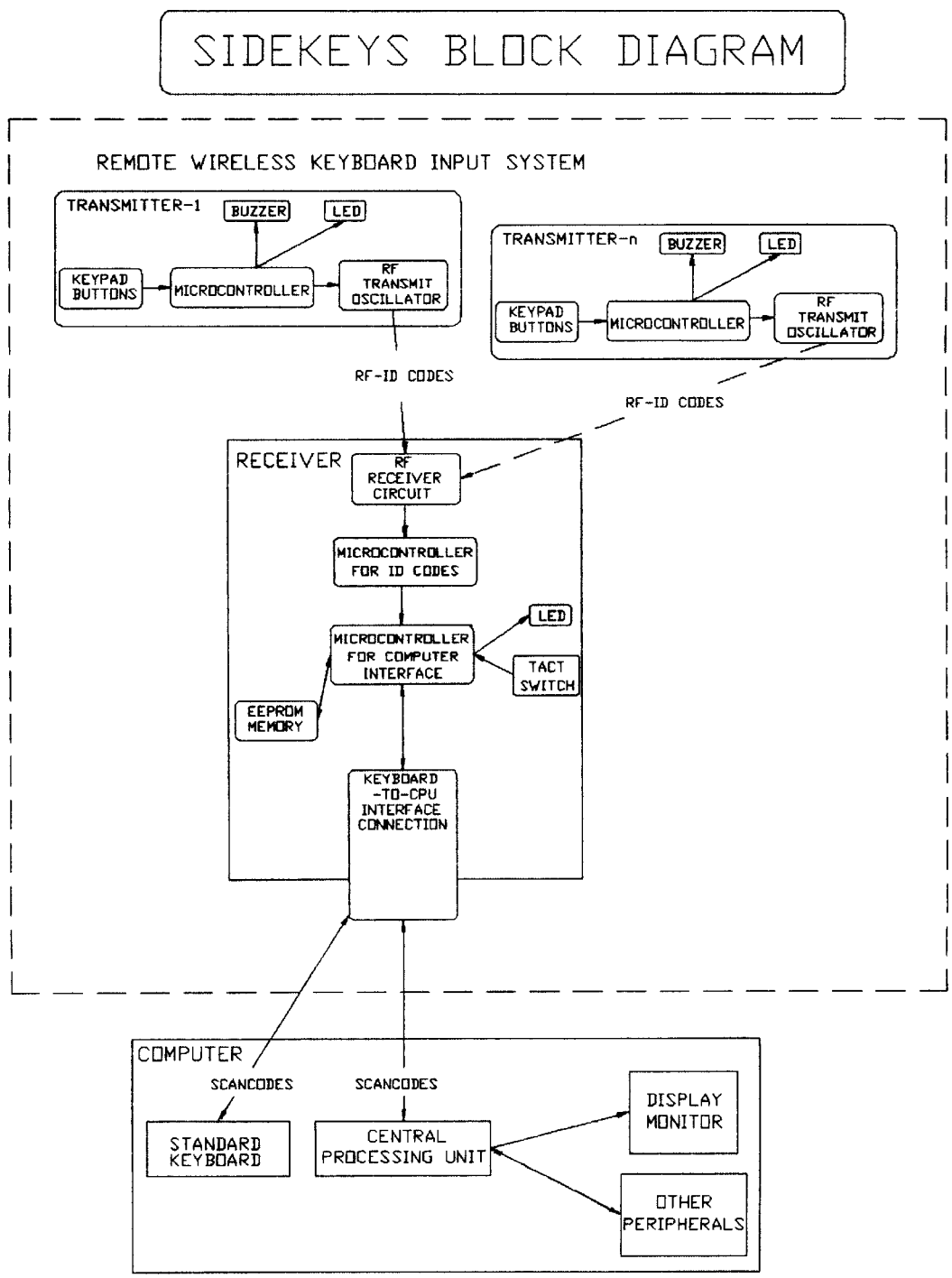
FIG. 4 is a block diagram illustrating the transmission of a signal from a Transmitter to a Receiver, and the recognition of a programmed ID-Code, and the transfer of its associated scancode or modified scancode to the central processing unit.

In use, and in reference to FIG. 4, a transmitter button is pressed, activating the transmitters internal circuitry which transmits a fixed RF ID-Code to the receiver. At the same time, the LED light on the transmitter lights and an internal buzzer sounds, confirming that a transmission is taking place. The ID-Code is received at the receiver. The RF receiver circuit and microcontroller for ID-Codes tests that the transmission is from a transmitter button that has been previously programmed to this receiver. If no, the transmission is ignored. If yes, the receiver gathers the scancode or modified scancodes associated with that particular ID-Code and sends it on to the CPU of the computer where the input is manipulated by the internal software of the computer. The receiver performs the above functions for each ID-Code transmitted by multiple transmitters and relays the associated scancodes on to the central processing unit in the same order in which it was received from the multiple Transmitters. Each Transmitter can send up to nine different ID-Codes to the Receiver and the Receiver can associate each of these nine codes with a different scancode or modified scancode.

Thus it is apparent that there has been provided, in accordance with the invention, a wireless, remote programmable keyboard input system for computers and method of programming same that fully satisfies the objects, aims and advantages set forth above. While the invention has been described in conjunction with specific embodiments, it is evident that many alternatives, modifications, and variations will be apparent to those skilled in the arts. Accordingly, it is intended the invention be limited only by the spirit and broad scope of the appended claims.

We claim:

1. A wireless, remote keyboard input system comprising:
   a receiver for receiving transmitted ID-Codes, the receiver further comprising a first connector means for connecting the receiver to a central processing unit keyboard port, a second connector means for accepting a standard keyboard, the standard keyboard remaining fully and independently able to communicate with the central processing unit through the receiver;
   at least one wireless transmitter having a plurality of transmitter buttons, each of the plurality of the transmitter buttons of the at least one wireless transmitter being individually programmed by the standard keyboard as enabled by the receiver, each of the plurality of the transmitter buttons having a unique ID-Code and the receiver retaining a scancode corresponding to each ID-Code as programmed, each of the plurality of transmitter buttons enabling activation of circuit means for transmitting the ID-Code to the receiver from the transmitter,
   whereby the standard keyboard can directly communicate with the central processing unit through the receiver and the at least one transmitter can communicate with the receiver through activating the circuit means which transmits the ID-Code to the receiver, the receiver recognizing the ID-Code, associates the ID-Code with the corresponding scancode previously programmed into the receiver from the standard keyboard, the receiver then transmitting the appropriate scancode to the central processing unit.

2. The wireless, remote keyboard input system of claim 1 wherein the receiver further comprises means for programming, the means for programming enabling the receiver to recognize the ID-Code transmitted by any individual transmitter button of the at least one wireless transmitter as corresponding to the preselected individual scancodes of the standard keyboard.

3. The wireless, remote keyboard input system of claim 2 wherein the means for programming further includes means for creating "macro" commands wherein activation of the circuit means for any individual transmitter button of the at least one wireless transmitter transmits an ID-Code recognized by the receiver as corresponding to multiple scancodes of the standard keyboard.

4. The wireless, remote keyboard input system of claim 1 wherein the at least one further comprises means for sequentially accepting ID-Codes and then transmitting, in the same sequential order, the scancodes associated with the ID-Codes from the transmitter button, even when more than one transmitter is actively using the input receiver.

5. The wireless, remote keyboard input system of claim 1 wherein the at least one wireless transmitter broadcasts fixed radio frequency wave ID-Codes to the receiver.

6. The wireless, remote keyboard input system of claim 1 wherein the at least one wireless transmitter broadcasts fixed infrared wave ID-Codes to the receiver.

7. The wireless, remote keyboard input system of claim 1 wherein the at least one wireless transmitter is a battery powered, hand held member.

8. The wireless, remote keyboard input system of claim 1 wherein the at least one wireless transmitter includes a light source for confirming the transmission of the ID-Code, the light source being energized by activation of the circuit means of any individual transmitter button.

9. The wireless, remote keyboard input system of claim 1 wherein the at least one wireless transmitter includes a sound source for confirming the transmission of the ID-Code, the sound source being energized by activation of the circuit means of any individual transmitter button.

10. A programmable keyboard input system for computers comprising:

a plurality of programmable transmitters having a plurality of transmitter buttons, each transmitter button of each of the plurality of transmitters enabling the transmission of an ID-Code;

a programmable receiver for receiving the transmitted ID-Code from any of the transmitter buttons of any of the plurality of transmitters, the programmable receiver further including first connector means for connecting the receiver to a keyboard port of a central processing unit of a computer and second connector means for accepting a standard keyboard, means for programming the plurality of transmitter buttons on the plurality of transmitters and the receiver, the means for programming including a switch on the receiver for initializing a programming sequence, the programming sequence enabling the ID-Code of each of the transmitter buttons of the plurality of transmitters to be programmed with a unique scancode, the unique scancode being received from the standard keyboard and assigned by the receiver to correspond to the ID-Code of each of the transmitter buttons, the unique scancode of each ID-Code being stored into a memory in the receiver, the programming sequence resulting in the programmable receiver recognizing the ID-Code transmitted by any of the plurality of transmitter buttons of any of the plurality of transmitters as corresponding to the unique scancode from the standard keyboard and stored in the memory, the programmable receiver further including means for sequentially accepting the ID-Codes from any of the plurality of transmitters in sequential order and then sending the corresponding associated scancodes to the central processing unit of the computer in the same sequential order in which the transmissions are received by the programmable receiver from the plurality of transmitters.

11. The programmable keyboard input system for computers of claim 10 wherein the means for programming further includes means for creating "macro" commands wherein the receiver recognizes a single transmitted ID-Code from the plurality of transmitters as initiating a series of scancodes from a standard keyboard.

12. The programmable keyboard input system for computers of claim 10 wherein the plurality of transmitters broadcasts radio frequency wave ID-Codes to the receiver.

13. The programmable keyboard input system for computers of claim 10 wherein the plurality of transmitters broadcasts fixed infrared wave ID-Codes to the receiver.

14. The programmable keyboard input system for computers of claim 10 wherein the plurality of transmitters is a battery powered, hand held member.

15. The programmable keyboard input system for computers of claim 10 wherein the plurality of transmitters includes a light source and a sound source for confirming the transmission of the ID-Code, the light source and the sound source being energized by activation of circuit means of any individual transmitter button.

16. A method for programming a wireless, remote keyboard input system for a computer, the computer of the type having at least a central processing unit having a keyboard port, a standard keyboard further having keyboard port attachment means, and a monitor, comprising the steps of:

connecting a receiver to the keyboard port of the central processing unit, the receiver being adapted to accept the standard keyboard port attachment means, connecting the keyboard port attachment means of the standard keyboard to the receiver, supplying power to at least the central processing unit, activating a programming switch on the receiver, the programming switch initializing a programming sequence, pressing a selected button located on a remote wireless transmitter, the transmitter transmitting an ID-Code that identifies the selected button of the transmitter, the receiver receiving the ID-Code from the transmitter, pressing a selected key on the standard keyboard, the standard keyboard transmitting the selected key to the receiver to define a scancode, the receiver assigning the scancode to the ID-Code of the selected button of the transmitter and storing the scancode into memory, completing the programming sequence by returning the system to a normal operating mode, and whereby upon activation of the selected button of the transmitter, the ID-Code of the selected button is received by the receiver, the receiver identifies the appropriate scancode in memory and transmits this appropriate scancode to the central processing unit.

17. The method of claim 16 further including the step of programming the selected button on the wireless transmitter to correspond to the scancodes that define a modified key from the standard keyboard.

18. A method for programming macro commands into a keyboard input system for computers, the computer of the type having at least a central processing unit having a keyboard port, a standard keyboard further having keyboard port attachment means, and a monitor, comprising the steps of:

connecting a receiver to the central processing unit keyboard port, the receiver being adapted to accept the keyboard port attachment means, connecting the keyboard port attachment means of the standard keyboard to the receiver, supplying power to at least the central processing unit, activating a programming switch on the receiver, the programming switch initializing a programming sequence, pressing a selected button located on a remote wireless transmitter, the transmitter transmitting an ID-Code that identifies the selected button of the transmitter, the receiver receiving the ID-Code from the transmitter, pressing a multiple set of selected keys on the standard keyboard the standard keyboard transmitting the multiple set of selected keys to the receiver to define a series of scancodes that are designed to transmit a macro command to the central processing unit, the receiver assigning the series of scancodes to the ID-Code of the selected button of the transmitter and storing the series of scancodes into memory, completing the programming sequence by returning the system to a normal operating mode, and whereby upon activation of the selected button of the transmitter, the ID-Code of the selected button is received by the receiver, the receiver identifies the appropriate series of scancodes in memory and transmits this appropriate series of scancodes to the central processing unit for execution of the macro command.

* * * * *